United States Patent
Tibbets

(10) Patent No.: US 9,440,318 B1
(45) Date of Patent: Sep. 13, 2016

(54) RAPID LOCK EXTRACTOR

(71) Applicant: Chad Jeremy Tibbets, Mesquite, TX (US)

(72) Inventor: Chad Jeremy Tibbets, Mesquite, TX (US)

(*) Notice: Subject to any disclaimer, the term of this patent is extended or adjusted under 35 U.S.C. 154(b) by 223 days.

(21) Appl. No.: 14/106,443

(22) Filed: Dec. 13, 2013

(51) Int. Cl.
*B25B 1/14* (2006.01)
*B25B 5/06* (2006.01)
*B25B 5/12* (2006.01)
*B23P 19/04* (2006.01)
*E05B 19/20* (2006.01)

(52) U.S. Cl.
CPC .............. *B23P 19/04* (2013.01); *B25B 1/14* (2013.01); *B25B 5/061* (2013.01); *B25B 5/12* (2013.01); *B25B 5/122* (2013.01); *E05B 19/20* (2013.01); *E05B 19/205* (2013.01); *Y10T 29/49815* (2015.01); *Y10T 29/49821* (2015.01); *Y10T 29/49822* (2015.01)

(58) Field of Classification Search
CPC .......... B25B 1/14; B25B 5/061; B25B 5/12; B25B 5/122; E05B 19/20; E05B 19/205; B23P 19/04; Y10T 29/49815; Y10T 29/49821; Y10T 29/49822
USPC .......... 29/426.1, 426.5, 244; 81/15.9, 177.7; 269/24, 32, 228; 70/367–369, 371; 33/540
See application file for complete search history.

(56) References Cited

U.S. PATENT DOCUMENTS

| | | | | |
|---|---|---|---|---|
| 3,972,103 A | * | 8/1976 | Kenyon | B25B 27/0035 29/263 |
| 4,059,883 A | * | 11/1977 | Osborne | B25B 27/023 279/42 |
| 4,707,903 A | * | 11/1987 | McCartney | B25B 27/02 29/258 |
| 4,756,214 A | * | 7/1988 | Valtri | B67B 7/066 81/3.36 |
| 4,982,493 A | * | 1/1991 | Wendt | E05B 19/20 29/264 |
| 6,536,088 B1 | * | 3/2003 | Chiang | B25B 27/06 29/255 |
| 6,725,697 B1 | * | 4/2004 | Leadon | B23B 41/00 29/426.1 |
| 7,685,852 B2 | * | 3/2010 | Komemi | E05B 17/0004 29/464 |
| 7,971,329 B1 | * | 7/2011 | Brohard | B25B 27/04 254/131 |

* cited by examiner

*Primary Examiner* — Christopher Besler
*Assistant Examiner* — Bayan Salone
(74) *Attorney, Agent, or Firm* — Jeffrey Roddy

(57) ABSTRACT

An apparatus for the rapid removal of components of a cylinder type lock includes a retention member for accepting a portion of a fastener which has been inserted into the keyway of a cylinder, a sliding yoke connected to the retention member and a pivoting handle for moving the yoke. The yoke and retention member are constrained to linear travel in either a forward or rearward direction enabling the extraction of the plug inline with the lock cylinder in a single movement of the handle.

7 Claims, 5 Drawing Sheets

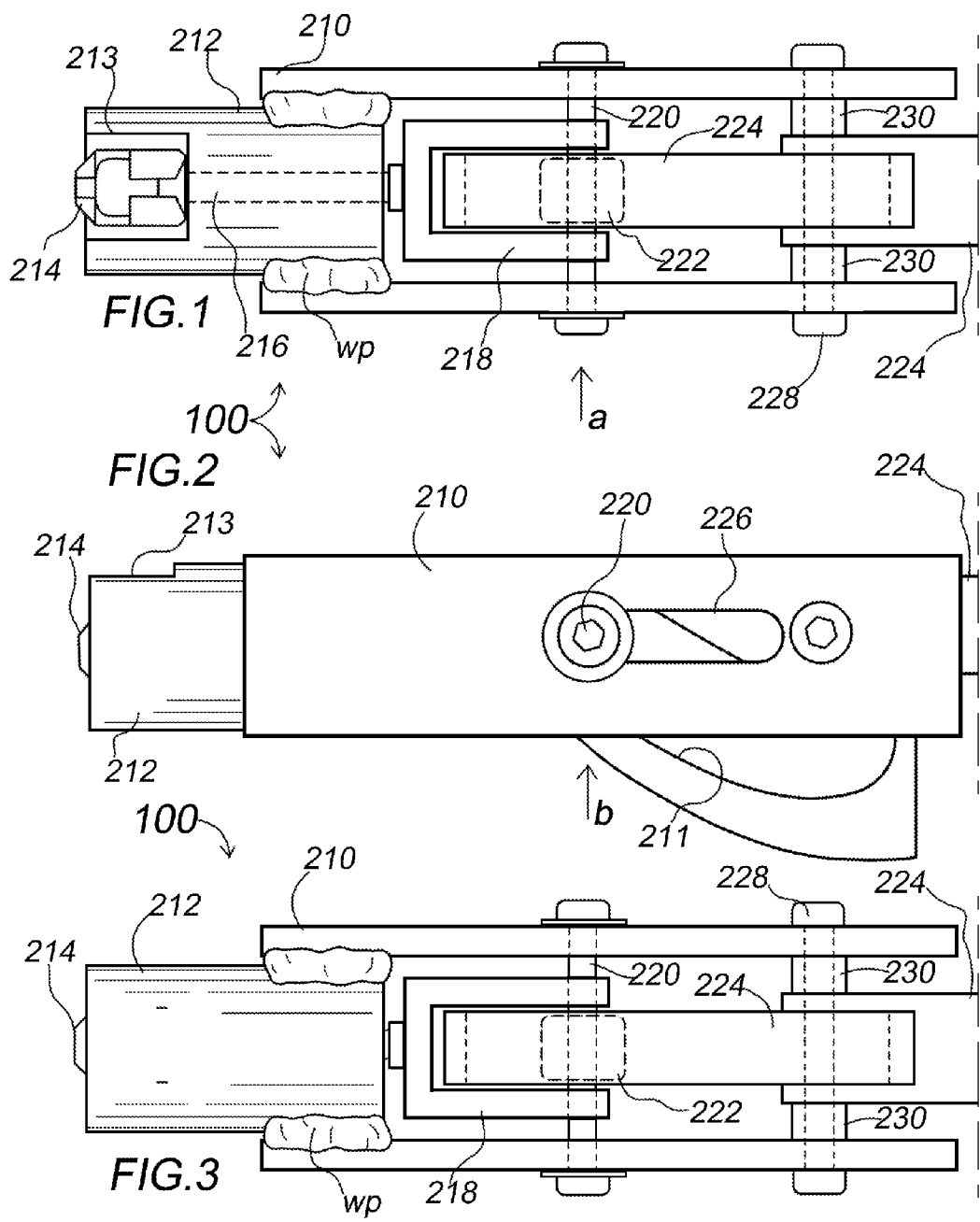

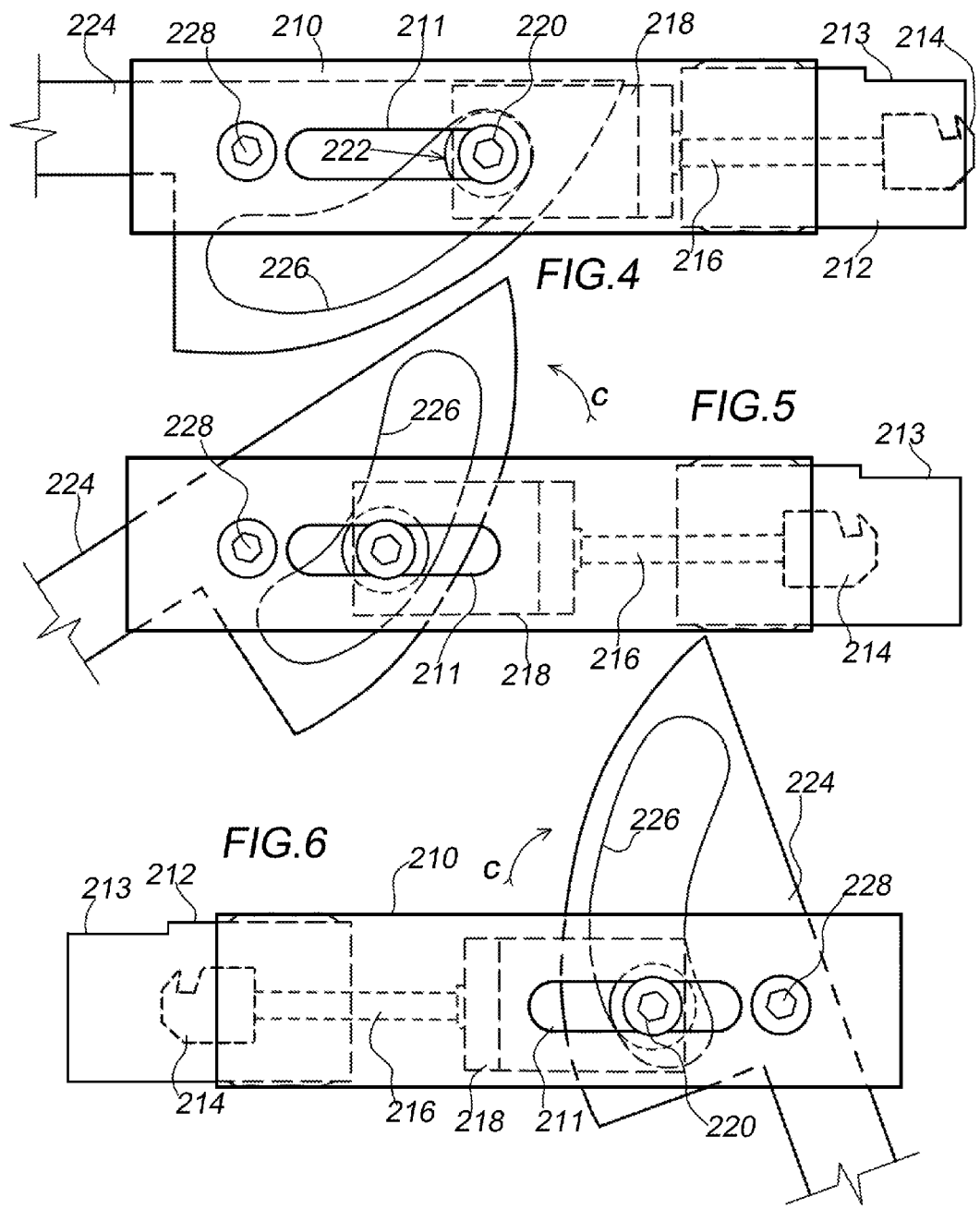

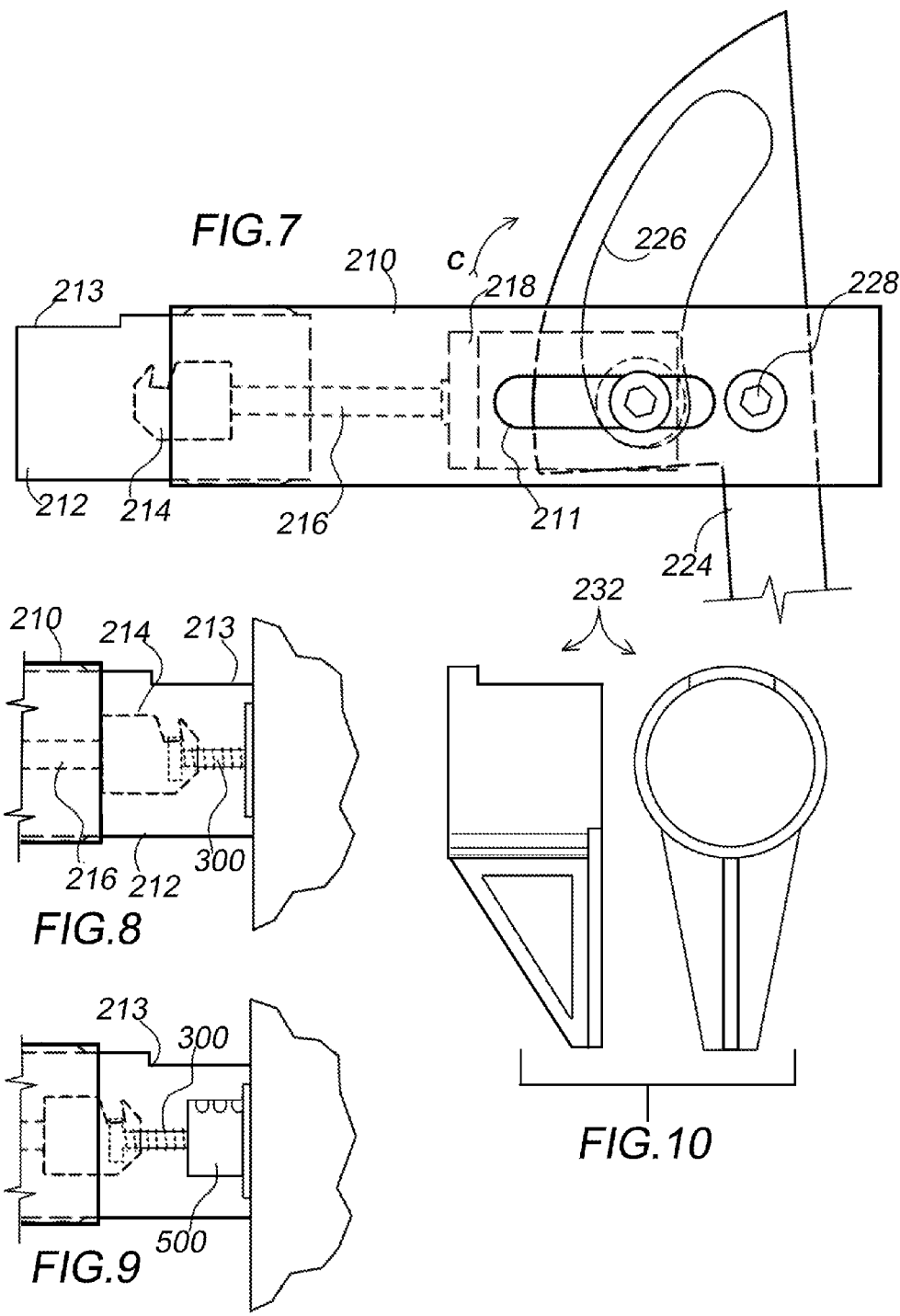

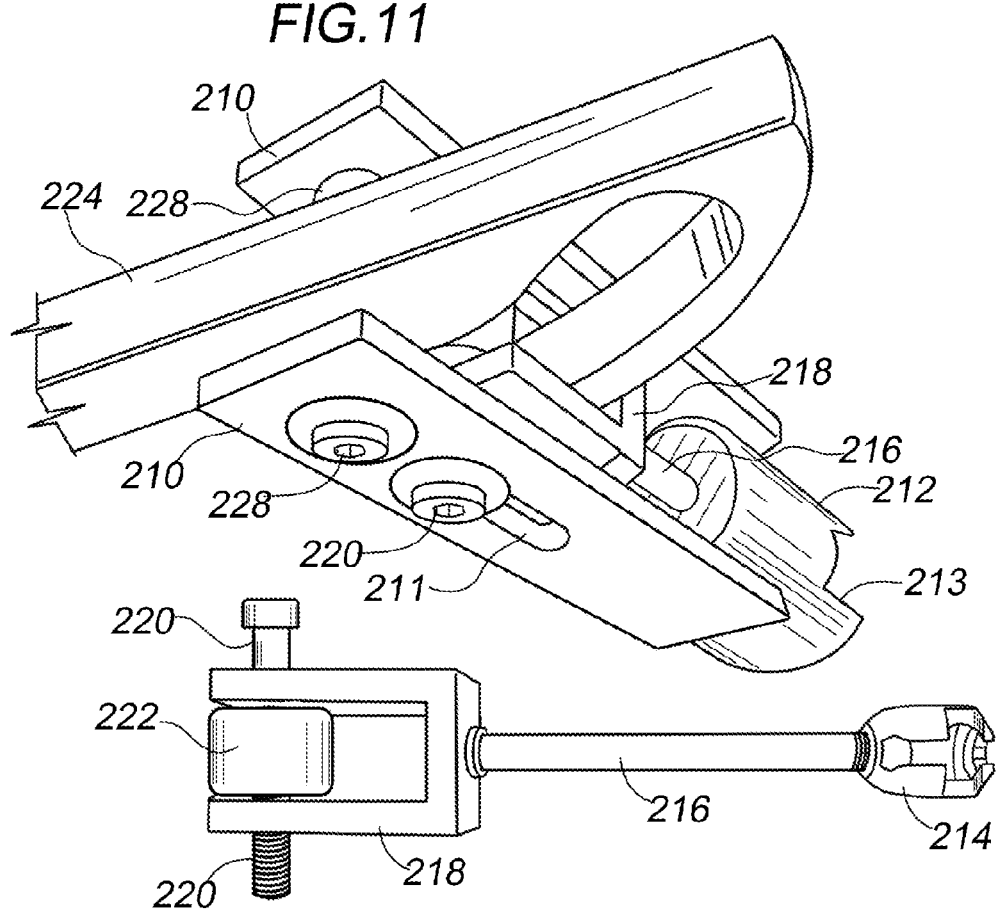

RAPID LOCK EXTRACTOR

FIELD

The present invention relates generally to an apparatus for extracting portions of cylinder type locks, and similar locks that are flush mounted or semi flush mounted to a door or other surface. More specifically, the apparatus enables the rapid removal and replacement of components of locks such as those used in safe deposit boxes in the banking industry.

BACKGROUND

Keyway cylinder removal tools or "lock pullers" of various types are known in the art. Typically, lock pullers permit the pulling of the "plug" from cylinder locks for replacement purposes. One type of destructive entry tool used by locksmiths that can extract either the entire cylinder or the plug alone from a safe deposit box and thereby provide access to the locking mechanism is the so-called "Bell" cylinder puller. In order to use the Bell device, a threaded fastener; typically a wood screw, is screwed into a keyway of a plug where it is held fast. The head of the fastener is temporarily retained by a portion of the tool that is coupled to one end of a lead screw positioned longitudinally within a cylindrical housing. At the end of the lead screw opposite the screw retaining portion is a hex nut. When the hex nut is turned, e.g., by a wrench, the retainer moves in an opposite direction to the housing which is braced against the mounting face of the lock, thereby drawing out the cylinder plug. The majority of destructive entry tools currently employed for removal of cylinder locks for replacement purposes are variants of the Bell device.

Other types of plug extractors have been described in the past. U.S. Pat. No. 4,707,903 to McCartney describes a nose plug puller for rekeying a Mosler type safe deposit box lock which includes a pull shaft that is partially threaded, a support, a nut and a cam key. Although the McCartney device teaches these as separate elements, when assembled, the device operates similarly to the Bell device whereby a cylinder plug is pulled by turning a lead screw. The plug is pulled by using the lock mounting surface to push against.

U.S. Pat. No. 6,725,697 to Leadon describes a keyway cylinder plug removal tool for a safe deposit box that uses a hole saw to cut through the retaining lip portion of a nose surround to free the plug.

While working well for their intended use, the foregoing devices are time consuming due to the number of turns required of the lead screw in order to draw out the cylinder plug; a distinct disadvantage in cases where multiple locks must be replaced en masse.

It would be desirable to provide a lock puller that extracts plugs much more rapidly than previous devices.

It would be desirable to provide a lock puller that performs the forgoing extraction without damage to either the face plate or plug surround.

It would be further desirable if such a lock puller were easy to use, requiring little practice in order to gain proficiency.

It would be especially desirable if the lock puller were readily adaptable to the majority of safe deposit box locks in use.

SUMMARY

The present invention relates generally to a cylinder plug extractor. More specifically, the apparatus of the present invention greatly expedites replacement of lock cylinders such as those used in safe deposit boxes. In the embodiment depicted herein, the apparatus assembly includes a frame which includes two plates side by side, wherein each plate has an elongate guide in the form of a slot, and the plates are aligned in the frame assembly. A u-shaped yoke resides between the plates. Supported transversely relative to the frame by the u-shaped yoke, a follower in the form of a transverse cross pin rides within the elongate guides. A post or shaft extends from the closed end of the yoke. At the distal end of the post is a fastener retention member which is slotted to accept the head portion of a fastener; typically a wood screw that has been inserted into the keyway of a cylinder lock. Between arms of the yoke and positioned radially on the follower is a radial bearing. A second cross pin positioned transverse the plates defines a pivot point for a handle, a portion of which includes an arcuate bearing guide. The arcuate bearing guide of the handle surrounds the radial bearing which follows the arc of the bearing guide when the handle is moved. When the handle is moved downwardly, this action has the effect of drawing the retention member, the fastener and the cylinder plug linearly in a backwards direction as the follower tracks with the elongate guide. It should be noted that while the particular embodiment depicted in this disclosure has a curved bearing guide which when moved relative to the radial bearing, forces the bearing and yoke forward or backward, the particular degree of arc of the bearing guide can be varied to draw the yoke at different rates relative to the pivoting action of the handle.

In one aspect of the present invention, the action of a pivoting handle extracts a cylinder plug by pulling the plug inline with; and outwardly from the cylinder.

In another aspect of the present invention a pivoting handle moves a guide that is tracked by at least one follower. The follower is linked to a fastener retention member that accepts and reversibly retains a portion of a fastener partially threaded into a keyway of a lock.

In the foregoing aspects, the fastener retention member is constrained to move in a linear direction by the follower tracking an elongate guide of the assembly.

It will be appreciated by those of ordinary skill in the art that the overall size of the apparatus of the present invention can vary. While preferably, the bearing guide is an arcuate aperture, it is also conceivable that it can be a arcuate or curved recess. The material of the apparatus can be of any sufficiently rigid material to withstand the pulling force of the handle transmitted to the fastener retention member when surround 212 is braced against the mounting surface of a lock. While surround 212 of the preferred embodiment is a rigid tubular construction, a plastic flange or rim 232, can be fitted to the end of the surround as a non-marring spacer, stabilizer or alignment aid to assist a user in maintaining proper contact and perpendicular alignment with the lock mounting surface when pulling plugs. It is also conceivable that the frame be adapted to accept a handle or grip, preferably extending from the bottom or sides of the frame or even as part of the alignment aid above, to assist a user with applying force to a lock mounting surface in order to maintain flush contact with the surface. Such a grip would be attached to the frame by any suitable means including a threaded shaft or attachment bracket.

The foregoing and other objects, features, and advantages of the invention will become more apparent from the following detailed description, which proceeds with reference to the accompanying figures wherein the scale depicted is approximate.

BRIEF DESCRIPTION OF THE DRAWINGS

FIG. 1 is a top plan view of one preferred embodiment according to the present invention;

FIG. 3 is a bottom plan view of the embodiment of (FIG. 2) taken in the direction of arrow (b);

FIGS. 1*a*-3*a* depict handles extending respectively from (FIGS. 1-3);

FIG. 4 depicts in a partial schematic, a side view of a preferred embodiment wherein the handle is inline with the frame and fastener retainer member is fully extended;

FIG. 5 in a continuation of (FIG. 4), handle is moved downwardly and retainer member is retracted fully into surround;

FIG. 6 in a continuation of (FIG. 5), handle is moved further downwardly and retainer member is further retracted;

FIG. 7 in a continuation of (FIG. 6), retainer member is fully retracted;

FIG. 8 in a partial side view shows a preferred embodiment according to the present invention wherein retainer member placed over a threaded fastener that has been screwed into a cylinder keyway;

FIG. 9 in a continuation of (FIG. 8), retainer member is shown being retracted with the cylinder plug being extracted from the lock;

FIG. 10 shows in side and top plan views a reversibly attachable stabilizing and alignment aid for attachment to the surround. The flange has a stabilizing portion and a tubular portion with a notch shown in dashed line that aligns with surround cut-out 213 when the tubular portion is placed over the surround;

FIG. 11 is a partial perspective view of a preferred embodiment according to the present invention;

FIG. 12 is a top down perspective view of yoke and retention member assembly.

DETAILED DESCRIPTION OF THE INVENTION

Reference Listing

Figure 1A:
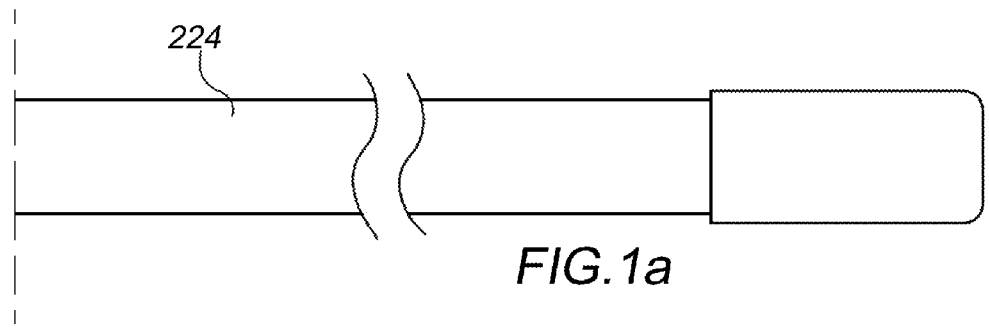

100 frame assembly
210 frame
211 elongate guide
212 surround
213 surround cut-out
214 fastener retaining member
216 post
218 yoke
220 follower
222 radial bearing
224 handle
226 bearing guide
228 handle pivot
230 bushing
232 stabilizing aid
300 threaded fastener
400 lock
500 plug

Definitions

In the following description, the term "follower" or "guide shaft" refers to a cylindrical post, pin or radial bearing that tracks a "guide," which is typically a straight or curved aperture or recess. Unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting.

Referring generally to FIGS. 1-12, a preferred embodiment according to the present invention for extracting components of a cylinder type lock includes a frame 210 having a surround 212 an elongate guide 211, a pair of cross members transverse the frame; one of which defines a follower 220 residing within guide slot 211, and a second cross member that defines a pivot point 228 for handle 224. A yoke 218 residing within the frame supports the follower and is connected to a fastener retention member 214 by post 216 which can be threaded into the body of retention member enabling the distance of the retention member to the lock mounting surface to be adjusted by rotating the retention member. Also, the post can be threaded into the yoke, and the retention member swivelable upon the post so that distance of the retention member to a mounting surface can be adjusted by rotating the post to extend or retract the same. Other means of adjusting the starting distance of the retention member to a lock mounting surface will suggest themselves to those having skill in the art and access to this disclosure. It is conceivable that the retention member possess recessed plural inline spaced notches to receive and reversibly retain the head portions of fasteners at varying distances. Radial bearing 222 mounted on the follower tracks the contour of bearing guide 226 when the handle is moved. When the handle is moved downwardly, the bearing guide which is eccentric to the handle's pivot point, moves up and draws radial bearing 222 rearwardly. Because the follower is connected to the yoke and travels within elongate guide 211, both the yoke and the retention member are constrained to linear travel. It should be noted however, that the orientation of the bearing guide can be reversed or the apparatus can be rotated so as to retract the retention member when the handle is moved upwardly or to the side.

Figure 2A:
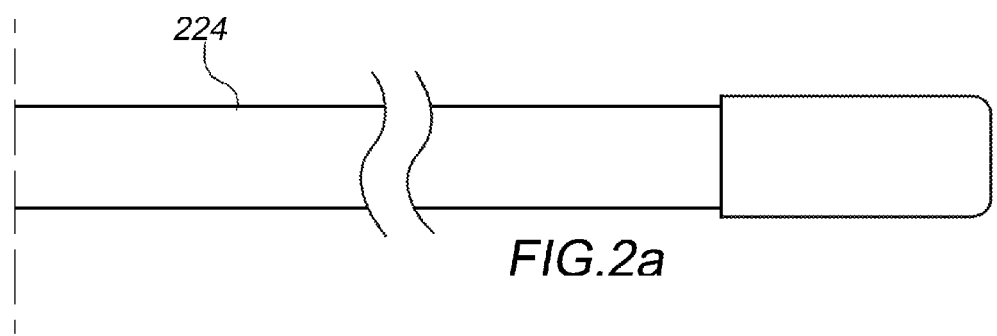
FIG. 2 is a side plan view of the embodiment of (FIG. 1) taken in the direction of arrow (a)
Figure 3A:
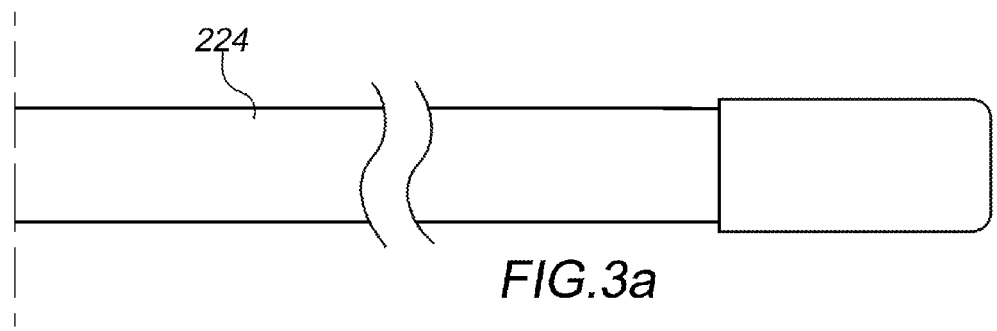

FIGS. 1-3 depict respectively, a top plan view, a side plan view and a bottom plan view of a preferred embodiment. Surround 212 encircles retention member 214 with the exception of cutout 213 that permits a threaded fastener to enter from the side of the surround for reversible coupling with the retention member which is slotted to accept the head of the fastener. Radial bearing 222 can be a roller bearing, or conceivably a bushing or sleeve that rotates about follower 220 and moves freely within bearing guide 226.

FIGS. 4-7 illustrate the movement of the individual components from an unretracted state (FIG. 4), to fully retracted (FIG. 7). Cross member 228 and follower 220 which define respectively, a pivot point for the handle, and a sliding support for the yoke are preferably centrally unthreaded shafts such as a carriage bolt, lag bolt or similar. Spacers or bushings 230 can be used to offset the handle and the yoke from sides of the frame. When the handle is moved downwardly, bearing guide 226 pivots in direction (c) drawing bearing 222 rearwardly. Bearing 222 is supported upon follower 220 which is in turn supported by yoke 218. Because the follower is constrained by elongate guide 211, the yoke and retention member are likewise constrained to linear forward or backwards travel when the handle is moved up or down.

Moving to FIGS. 8 and 9 with reference again to FIGS. 4-7; in order to use the present invention, a one way insert is placed in the keyway of a cylinder lock. The insert can be a threaded fastener 300 as depicted in the preferred embodiment or a tapered element having surface irregularities that once inserted into a keyway, resists withdrawal therefrom. With the plug removal tool unretracted, retention member 214 is slipped around the head of the fastener and the surround braced against the mounting surface (ms) of the lock, such as the door face of a safe deposit box. Handle 224 is pulled down, causing bearing 222 to follow within the contours of eccentric bearing guide 226. Yoke 218 is drawn linearly and rearwardly as follower 220 slides within guide 211 drawing with it the retention member, engaged fastener 300 and cylinder plug 500.

It should be understood that the drawings and detailed description herein are to be regarded in an illustrative rather than a restrictive manner, and are not intended to be limiting to the particular forms and examples disclosed. The configuration of a handle, handhold or grip of the tool can be of any design and can be for one or two-handed operation. Accordingly, it is intended that this disclosure encompass any further modifications, changes, rearrangements, substitutions, alternatives, design choices, and embodiments as would be appreciated by those of ordinary skill in the art having benefit of this disclosure, and falling within the spirit and scope of the following claims.

What is claimed is:

1. An apparatus for extracting lock components from a cylinder type lock comprising:
   (1) a frame with a front portion, a rear portion opposite the front portion, a longitudinal passageway between the front portion and rear portion, at least a first guide, a surround located at the front portion, and a pivoting handle;
   (2) a second guide disposed about a pivoting point having an axis of rotation transverse the longitudinal passageway of the frame, and, wherein the second guide is moved by pivoting motion of the handle; and,
   (3) within the surround, a fastener retention member configured to reversibly accept the head of a threaded fastener previously inserted into a keyway of the lock, wherein the retention member is linked to a follower that is transverse the longitudinal passageway of the frame and configured to linearly track the first guide when the second guide is pivoted about the pivoting point by the handle thereby extracting components of the lock.

2. The apparatus according to claim 1 wherein the first guide constrains the retention member to back and forth linear movement, and the surround is braced against a mounting surface of a lock.

3. The apparatus according to claim 1 wherein the follower or a portion thereof tracks the second guide when the guide is moved.

4. The apparatus according to claim 1 wherein starting distance of retention member from a lock mounting surface is adjustable.

5. The apparatus according to claim 1 wherein the second guide is arcuate.

6. A method for extracting lock components from a cylinder type lock comprising the steps:
   (1) providing a lock removal device including a frame with a front portion, a rear portion opposite the front portion, a longitudinal passageway between the front portion and rear portion, at least one member for bracing contact with a mounting surface of a lock, at least two guides wherein at least one guide of the at least two guides has a pivoting point with an axis of rotation transverse the longitudinal passageway, at least one follower transverse the longitudinal passageway adapted to track at least one of the two guides during tracking, a pivotable handle and slotted retention means for reversibly retaining a head of a fastener,
   (2) inserting the fastener into the keyway of a cylinder lock,
   (3) reversibly retaining the head portion of the fastener by the retention member, and,
   (4) while bracing portions of the device against the mounting surface, moving the pivotable handle to force the retention member perpendicularly away from the mounting surface thereby pulling components of the lock away from the mounting surface.

7. The method of claim 6 wherein at least one of the guides constrains the follower to a substantially linear path in either a forward for backward motion.

* * * * *